United States Patent
Arditi et al.

(10) Patent No.: US 8,180,739 B2
(45) Date of Patent: May 15, 2012

(54) DUPLICATE FILTERING IN A DATA PROCESSING ENVIRONMENT

(75) Inventors: Joel Arditi, Haifa (IL); David Harold Berk, Haifa (IL); Dagan Gilat, Haifa (IL); Sergey Krutyolkin, Haifa (IL); Ariel Landau, Haifa (IL); Uri Shani, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 12/509,507

(22) Filed: Jul. 27, 2009

(65) Prior Publication Data
US 2011/0022572 A1    Jan. 27, 2011

(51) Int. Cl.
*G06F 17/30* (2006.01)

(52) U.S. Cl. ........................... 707/692; 707/802

(58) Field of Classification Search ............. 707/692, 707/696, 741, 662, 663, 664, 791, 795, 802
See application file for complete search history.

(56) References Cited

U.S. PATENT DOCUMENTS

| | | | | |
|---|---|---|---|---|
| 4,620,295 | A * | 10/1986 | Aiken, Jr. ................. | 715/234 |
| 5,813,009 | A * | 9/1998 | Johnson et al. ............ | 707/695 |
| 6,381,601 | B1 | 4/2002 | Fujiwara et al. | |
| 7,370,068 | B1 | 5/2008 | Pham et al. | |
| 7,443,321 | B1 * | 10/2008 | Kaufman et al. ........... | 341/87 |
| 2006/0176310 | A1 * | 8/2006 | Arnaud et al. ............. | 345/582 |
| 2008/0016106 | A1 * | 1/2008 | Worrall .................... | 707/102 |
| 2008/0059492 | A1 | 3/2008 | Tarin | |
| 2009/0019345 | A1 * | 1/2009 | Kaufman et al. ........... | 714/807 |
| 2009/0187546 | A1 * | 7/2009 | Hamilton Whyte .......... | 707/3 |

FOREIGN PATENT DOCUMENTS

JP    01173230 A2    7/1989

OTHER PUBLICATIONS

Oracle Partitioning, http://www.oracle.com/solutions/business_intelligence/partitioning.html.
Bishwaranjan Bhattacharjee, "Performance Study of Rollout for Multi Dimensional Clustered Tables in DB2," IEEE, 2006.

* cited by examiner

*Primary Examiner* — Cam-Linh Nguyen
(74) *Attorney, Agent, or Firm* — F. Jason Far-hadian; Century IP Group

(57) ABSTRACT

A data processing method is provided. The method comprises collecting a stream of data records from one or more devices in a network; loading one or more persistent indexes associated with the stream of data records into memory; identifying duplicate data records in the stream of data records using the in-memory indexes; and updating a repository such that the duplicate data records are not stored in the repository or managed differently than non-duplicate data records.

20 Claims, 9 Drawing Sheets

DUPLICATE FILTERING IN A DATA PROCESSING ENVIRONMENT

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of the claimed subject matter to material associated with such marks.

TECHNICAL FIELD

The claimed subject matter relates generally to data processing environments and, more particularly, to duplicate filtering in a data processing environment.

BACKGROUND

One or more devices in a network may generate a stream (i.e., a continuous flow) of data records, which are processed and stored in a repository. Typically, each data record associates values with data fields, and the values of one or more fields are used to identify the record. Such fields are referred to as keys. The record is a duplicate copy if there is another record that associates the same values with the keys.

In existing implementations, a single index is utilized to filter duplicate copies for the entire stream of records. Unfortunately, such implementations are inefficient, resulting in significant cost with respect to time and other resources without serving any purpose beyond the duplicate filtering. Moreover, the repository is usually partitioned into multiple parts, which may make constructing a single index for the entire stream of records difficult.

SUMMARY

The present disclosure is directed to systems and corresponding methods that facilitate efficient duplicate filtering in a data processing system.

For purposes of summarizing, certain aspects, advantages, and novel features have been described herein. It is to be understood that not all such advantages may be achieved in accordance with any one particular embodiment. Thus, the claimed subject matter may be embodied or carried out in a manner that achieves or optimizes one advantage or group of advantages without achieving all advantages as may be taught or suggested herein.

In accordance with one embodiment, a data processing method is provided. The method comprises collecting a stream of data records from one or more devices in a network; loading one or more persistent indexes associated with the stream of data records into memory; identifying duplicate data records in the stream of data records using the in-memory indexes; and updating a repository such that the duplicate data records are not stored in the repository or managed differently than non-duplicate data records.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The claimed subject matter is not, however, limited to any particular embodiment disclosed.

BRIEF DESCRIPTION OF THE DRAWINGS

Embodiments of the claimed subject matter are understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXEMPLARY EMBODIMENTS

In the following, numerous specific details are set forth to provide a thorough description of various embodiments of the claimed subject matter. Certain embodiments may be practiced without these specific details or with some variations in detail. In some instances, certain features are described in less detail so as not to obscure other aspects of the disclosed embodiments. The level of detail associated with each of the elements or features should not be construed to qualify the novelty or importance of one feature over the others.

Figure 1:
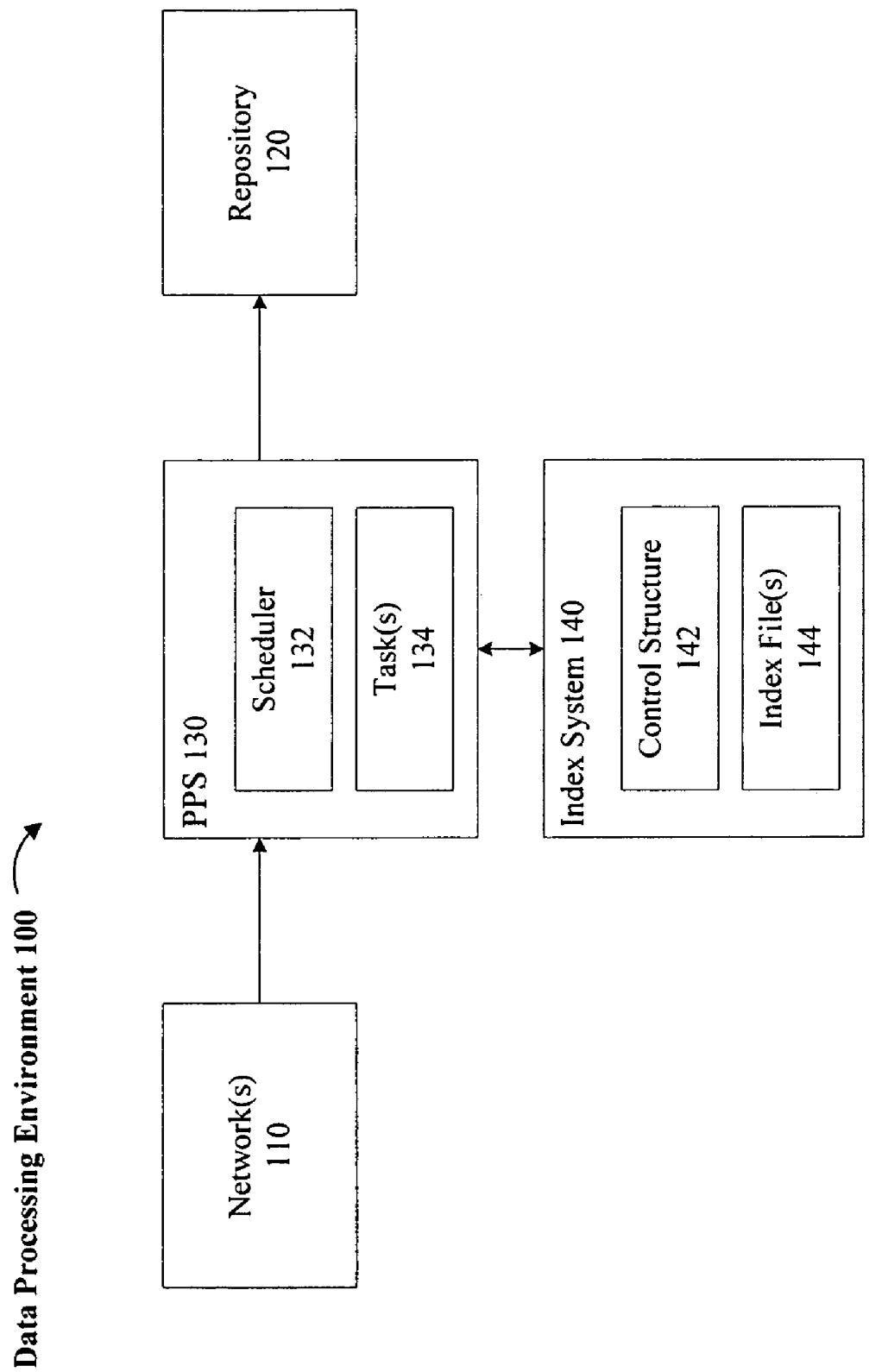
FIG. 1 illustrates an exemplary data processing environment, in accordance with one or more embodiments.

Referring to FIG. 1, in accordance with one embodiment, an exemplary data processing environment 100 comprises a network of one or more devices 110 that generate a stream of data records, a repository 120 for storing the records, a parallel processing system (PPS) 130 for processing the records, and an index system 140 for identifying records stored in the repository 120. In one implementation, for example, the repository 120 may be a database, and the PPS 130 may be an application executed by the database management system (DBMS).

In one embodiment, if there are a large number of data records arriving in the stream, the PPS 130 executes a scheduler 132 that divides the stream into one or more sets of records. Each set of records is processed by a task 134 executed in parallel with other tasks 134 by the PPS 130. For example, if a system receives about one billion records each day and each task executed by the system processes about a 1000 records per second, the system may execute at least 12 tasks in parallel to continuously sustain the stream of records. Desirably, as the number of records increases, the degree of independence between the tasks 134 may be increased proportionally to allow more tasks to be executed concurrently.

Each data record in the stream may be identified according to values associated with one or more fields, or keys. In one embodiment, one or more of the keys may be used to provide a higher-order value, and the rest of the keys may be used to provide a lower-order value. The higher-order value may be shared by one or more data records, while the lower-order value may be used in combination with the higher-order value to identify a particular record.

For example, a data record of a transaction may be identified by an identification (ID) of a device that performed the transaction, a time slot during which the transaction occurred, the time of the transaction, and an ID for the user who requested the transaction. In such a scenario, the higher-order value may be a combination of the device ID and the time slot, and the lower-order value may be a combination of the transaction time and the user ID.

In some embodiments, the scheduler 132 divides the stream of records into sets according to the higher-order values (e.g., device IDs and time slots) provided by the records. For example, a first set of records may comprise records that share a first higher-order value (e.g., device ID="001" and time slot="morning"), and a second set of records may comprise records that share a second higher-order value (e.g., device ID="002" and time slot="afternoon"). In one implementation, if a set of records is saved as an input file, the name of the input file may provide the higher-order value (e.g., file name="morning/001". In another implementation, the higher-order value may be provided in a separate metadata file that accompanies the input file.

Each higher-order value may be registered with a persistent control structure 142 included in the index system 140. Persistence refers to the ability to retain data after completing the execution of the program or process that generated the data. In one exemplary embodiment, the control structure 142 may be implemented as a table and a higher-order value may be registered with the control structure 142 by adding a row to the table. It is noteworthy, however, that the control structure 142 may be implemented in form of other types of data structures such as arrays and hash maps, for example.

A persistent index file 144 may be generated in the index system 140 for each higher-order value (e.g., for each device ID and time slot combination) that is registered with the control structure 142. Each index file 144 may save a lower-order value (e.g., the transaction time and user ID) provided by each record that shares the higher-order value for which the index file 144 was generated.

Figure 2:
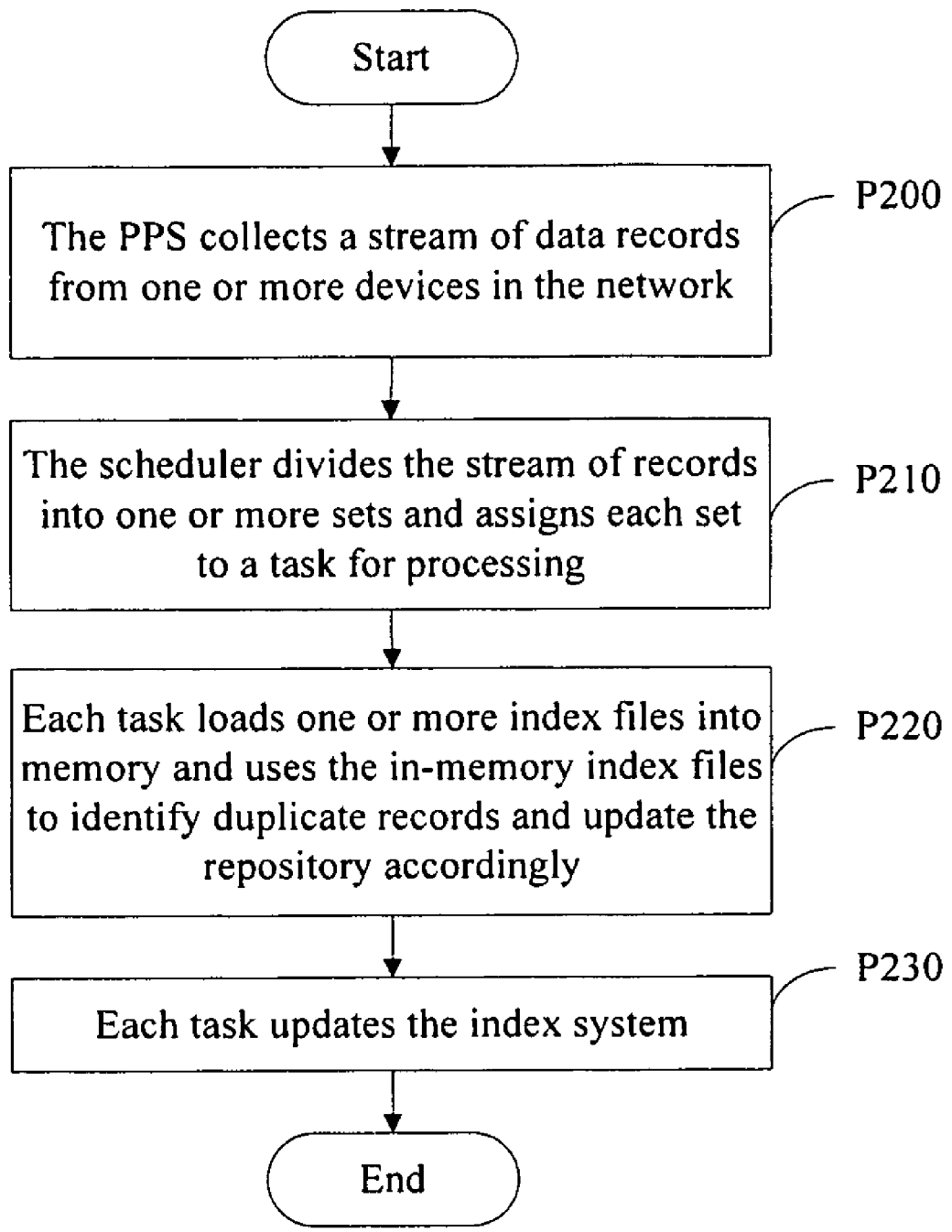
FIG. 2 is a flow diagram of a method for processing a stream of data records, in accordance with one embodiment.

Referring to FIGS. 1 and 2, in accordance with one embodiment, the PPS 130 collects a stream of data records from one or more devices in the network 110 (P200). As the records are collected, the scheduler 132 divides the records into one or more sets and assigns each set to a task 134 for processing (P210).

Each task 134 loads one or more index files 144 into memory, as provided in more detail below with reference to FIGS. 3 through 5, and uses the in-memory index files 144 to identify duplicate records (P220) and update the repository 120 accordingly, as provided in more detail below with reference to FIG. 6. Once the records are processed, the task 134 updates the index system 140 (P230), as provided in more detail below with reference to FIG. 7.

Figure 3:
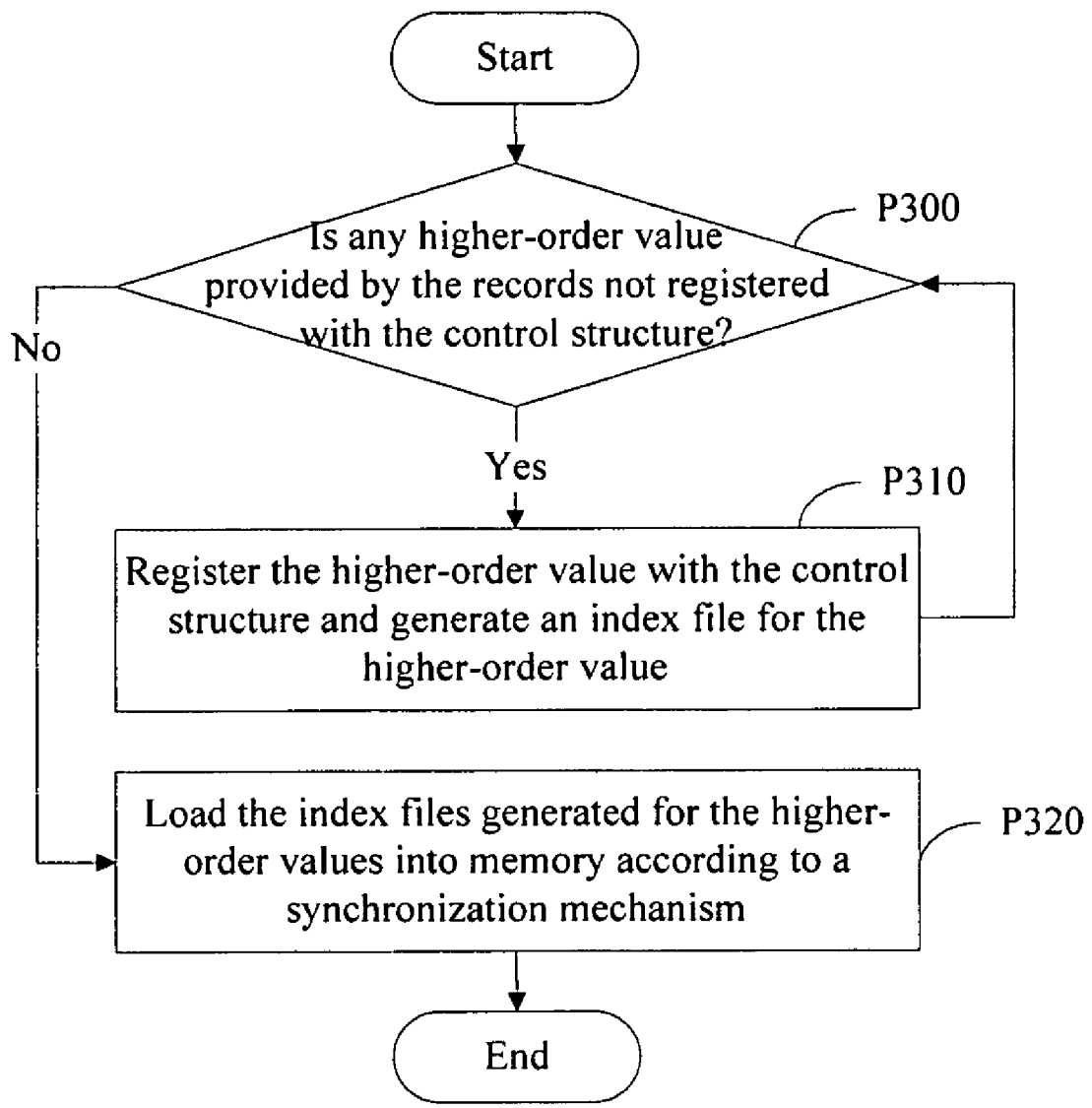
FIG. 3 is a flow diagram of a method for processing a set of data records, in accordance with one embodiment.

Referring to FIGS. 1 and 3, in accordance with one embodiment, a task 134 is executed to process a set of data records. Upon being executed, the task 134 determines whether any higher-order values (e.g., device ID and time slot) provided by the records is not registered with the control structure 142 (P300). For each higher-order value that is not registered, the task 134 registers the higher-order value with the control structure 142 and generates an index file 144 (P310).

Once each higher-order value is registered with the control structure 142, the task 134 loads the index files 144 generated for the higher-order values into memory according to a synchronization mechanism (P320).

Figure 4:
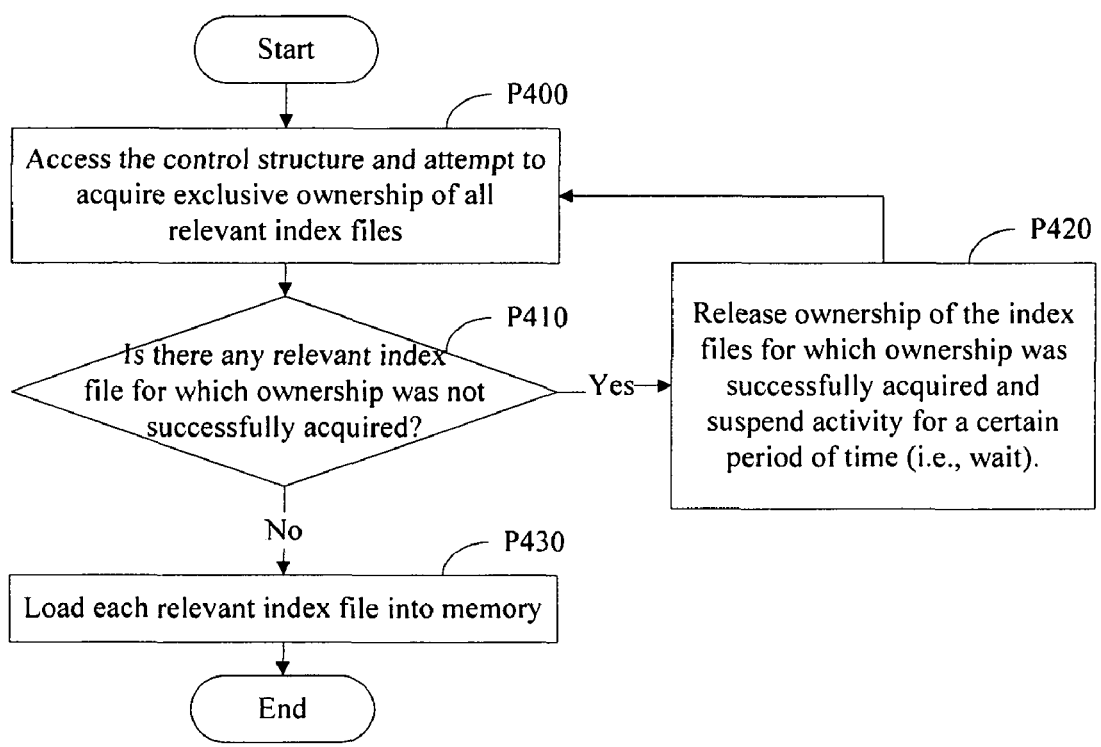
FIG. 4 is a flow diagram of a first method for synchronizing access to an arbitrary collection of index files, in accordance with one embodiment.

Referring to FIGS. 1 and 4, in accordance with one embodiment, the task 134 loads each index file 144 into memory according to a first synchronization mechanism. The task 134 accesses the control structure 142 and attempts to acquire exclusive ownership of each index file 144 (P400). In one implementation, for example, the task 134 acquires ownership of an index file 144 by assigning its unique task ID to an owner field of the control structure 142 entry corresponding to the index file 144.

The task 134 may fail to acquire ownership of an index file 144 if the index 144 is owned by another task 134 or if there is a system failure caused by a rollback or a deadlock exception. If the task 134 fails to successfully acquire ownership of each index file 144 (P410), the task 134 releases ownership of the index files 144 for which ownership was successfully acquired and reattempts to acquire ownership of each index file 144 after a certain period of time (P420). Upon successfully acquiring ownership of each index file 144, the task 134 loads each index file 144 into memory (P430).

Figure 5:
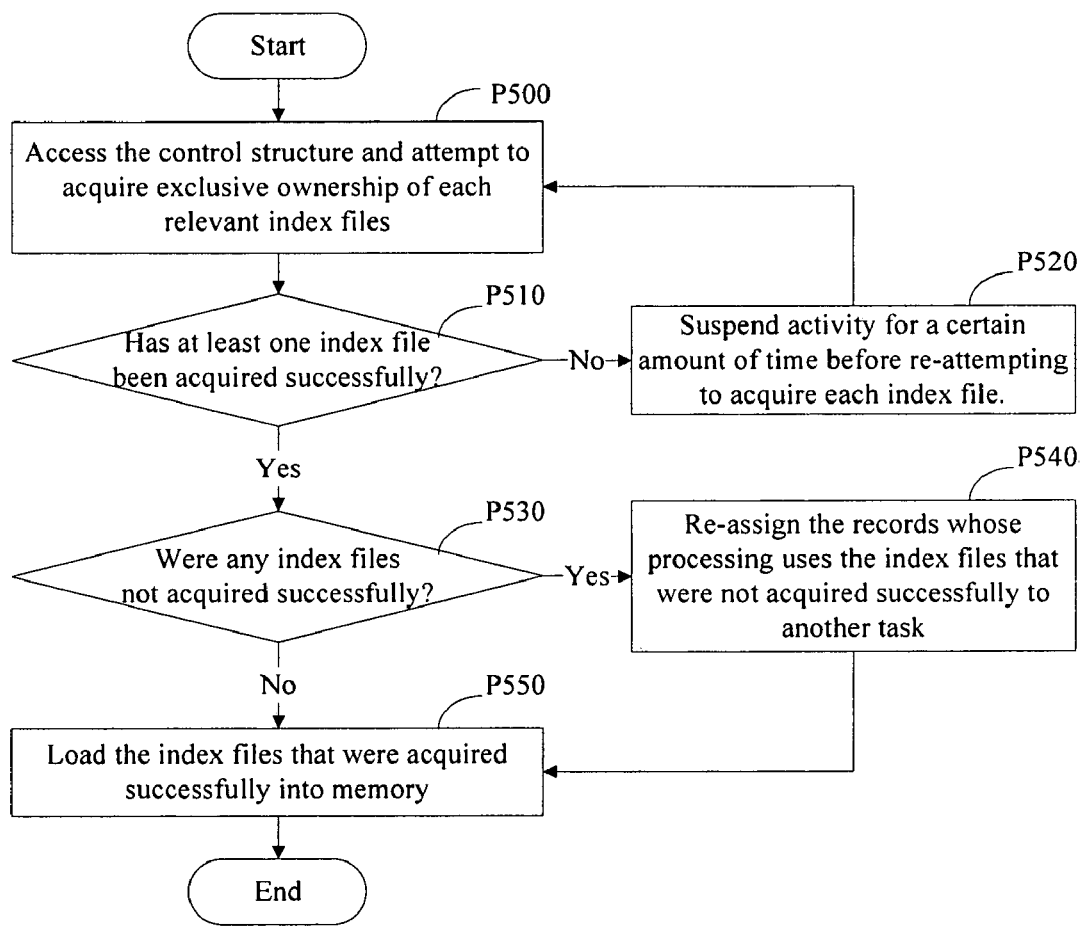
FIG. 5 is a flow diagram of a second method for synchronizing access to an arbitrary collection of index files, in accordance with one embodiment.

Referring to FIGS. 1 and 5, in accordance with one embodiment, the task 134 loads each index file 144 into memory according to a second synchronization mechanism. The task 134 accesses the control structure 142 and attempts to acquire exclusive ownership of each index file 144 (P500). If the task 134 fails to acquire at least one of the index files 144 (P510), the task 134 suspends activity for a certain amount of time before re-attempting to acquire each index file 144 (P520). Once the certain amount of time elapses, the task 134 re-attempts to acquire each index file 144 (P500). If each index file 144 cannot be acquired successfully (P530), records whose processing uses the index files 144 that were not acquired successfully are re-assigned to another task 134 (P540). Upon successfully acquiring at least one index file 144 (P510 and P530), the task 134 loads the successfully acquired index files 144 into memory (P550).

Figure 6:
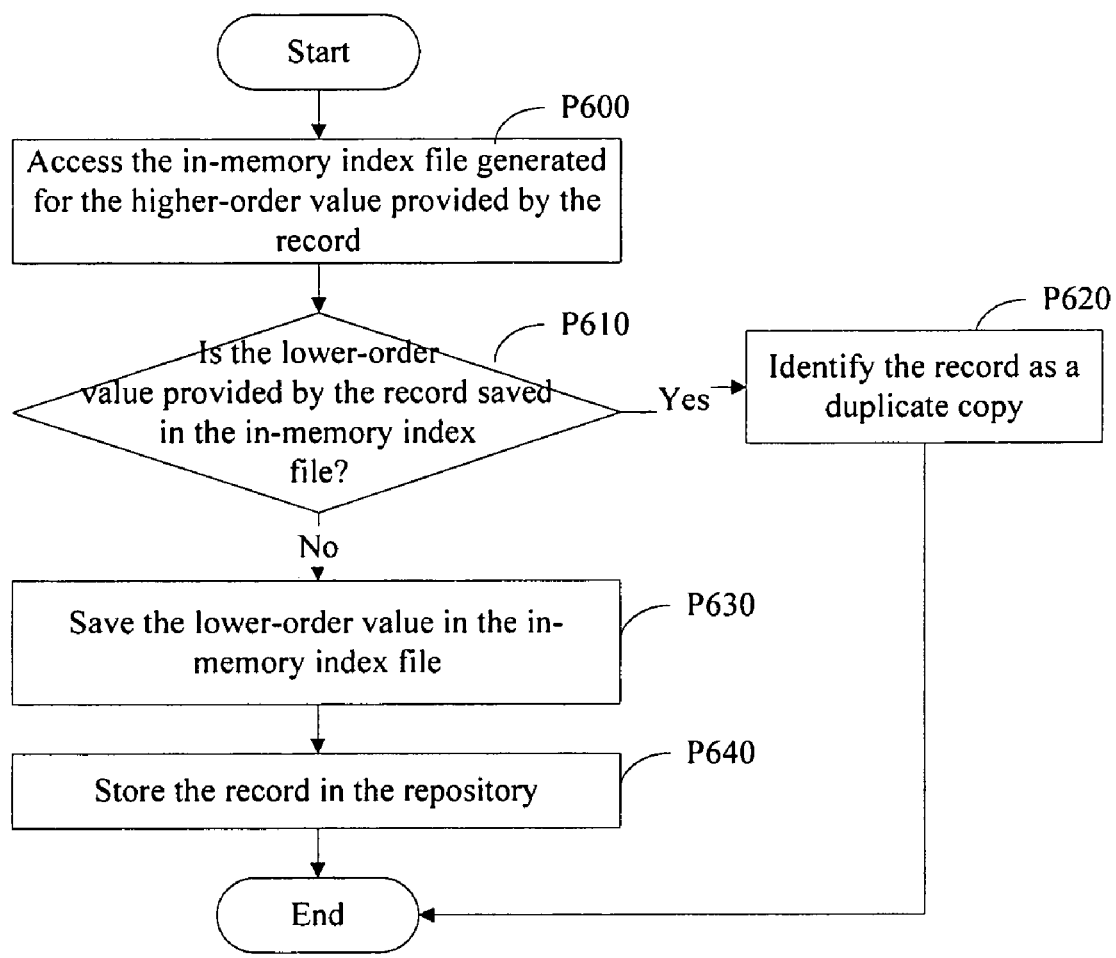
FIG. 6 is a flow diagram of a method for identifying a data record as a duplicate copy, in accordance with one embodiment.

Referring to FIGS. 1 and 6, in accordance with one embodiment, the task 134 may identify a data record as a duplicate copy using an in-memory index file. The task 134 accesses the in-memory index file generated for the higher-order value (e.g., device ID and time slot) provided by the record (P600). If the lower-order value (e.g., transaction time and user ID) is saved in the in-memory index file (P610), the record is identified as a duplicate copy and may not be stored in the repository 120 (P620). Otherwise, the lower-order value is saved in the in-memory index file (P630) and the record is stored in the repository 120 (P640).

Figure 7:
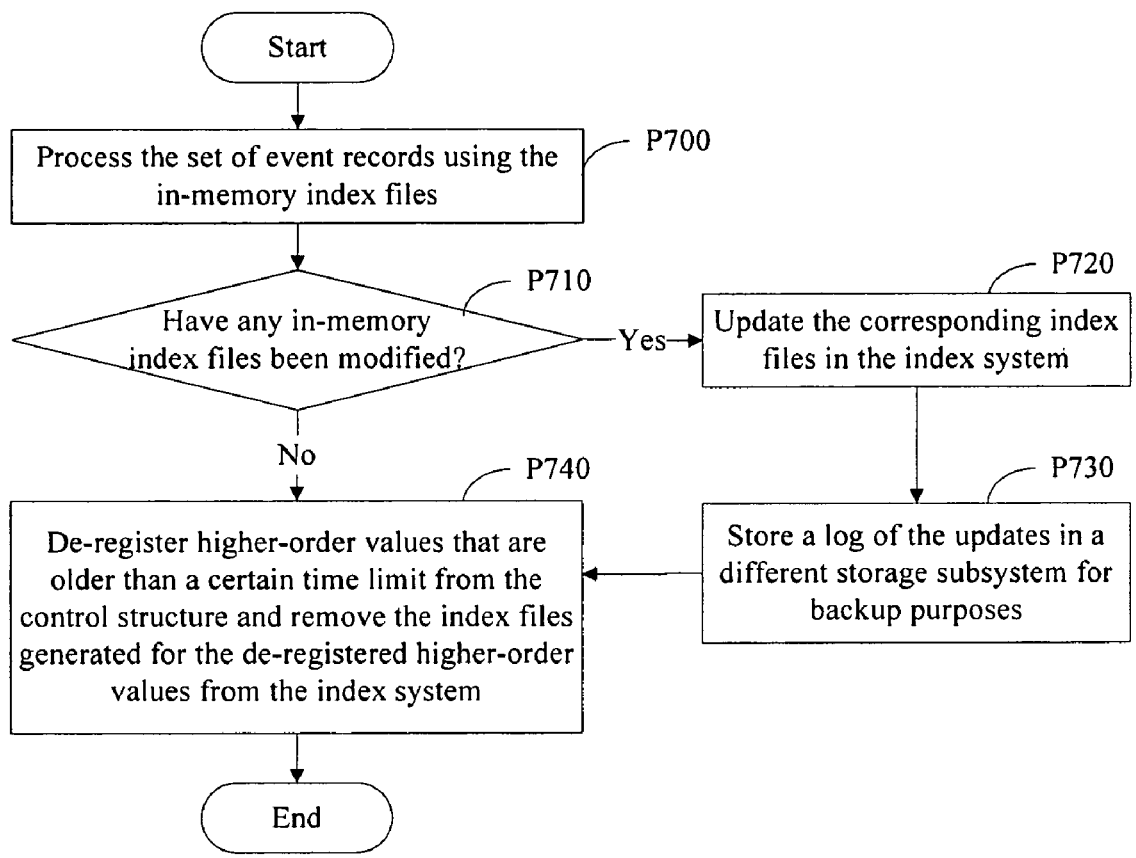
FIG. 7 is a flow diagram of a method for updating index files, in accordance with one embodiment.

Referring to FIGS. 1 and 7, in accordance with one embodiment, the task 134 finishes processing the records (P700) and determines whether the in-memory index files have been modified (P710). If any in-memory index file has been modified, the task 134 updates the corresponding index file 144 (P720). In one implementation, the task 134 may also store a log of the update in a different storage subsystem for backup purposes (P730).

In another implementation, the index system 140 may index records for a limited period of time. That is, higher-order values that are older than a certain time limit may be de-registered from the control structure 142, and index files 144 that are older than the certain time limit may be removed (P740). For example, a record that is no longer indexed by the index system 140 may be associated with a tag that indicates that the record is not being checked during duplicate filtering. Indexing records for a limited period of time increases efficiency with respect to storage space since the possibility of finding duplicate copies decreases with the passage of time.

Advantageously, the systems and methods described above provide scalability with respect to growing repositories. The size of the index system 140 increases constantly with the size of the repository 120, instead of proportionally.

Further, the systems and method described above provide higher performance in terms of both delay time and system throughput. With respect to delay time, searching for duplicate copies using particular in-memory index files for a set of records is much faster than doing so using a single index file for the entire stream of records. With respect to system throughput, multiple sets of records are processed in parallel, which is possible since each set accesses different index files.

In different embodiments, the claimed subject matter may be implemented either entirely in the form of hardware or entirely in the form of software, or a combination of both hardware and software elements. For example, the data processing environment 100 may comprise a controlled computing system environment that may be presented largely in terms of hardware components and software code executed to perform processes that achieve the results contemplated by the system of the claimed subject matter.

Figure 8:
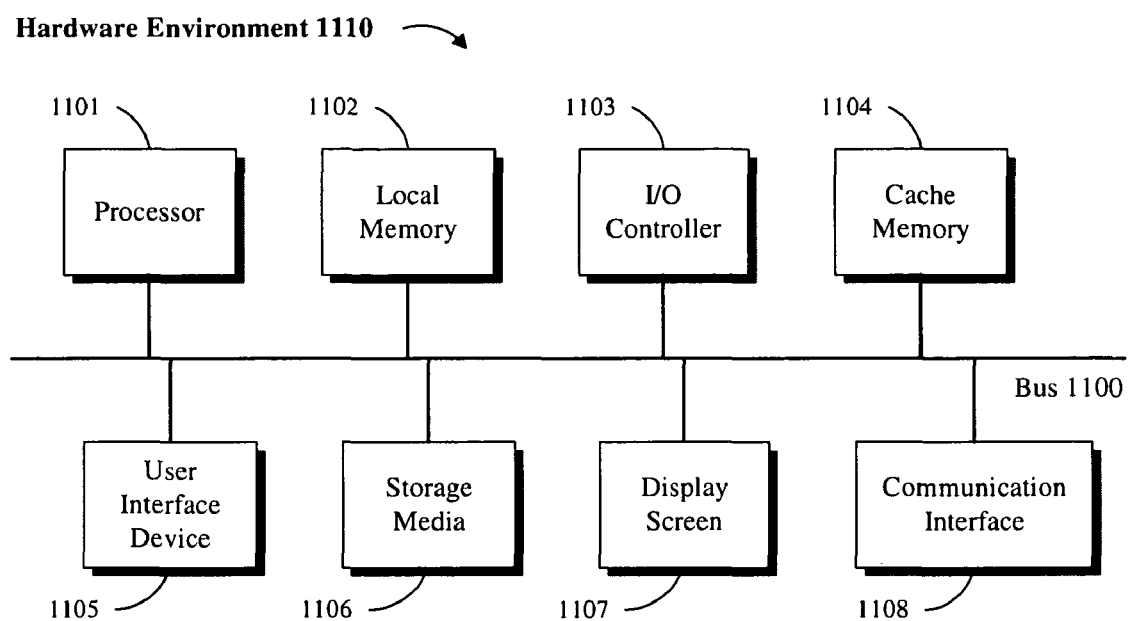
FIGS. 8 and 9 are block diagrams of hardware and software environments in which a system of the present invention may operate, in accordance with one or more embodiments.
Figure 9:
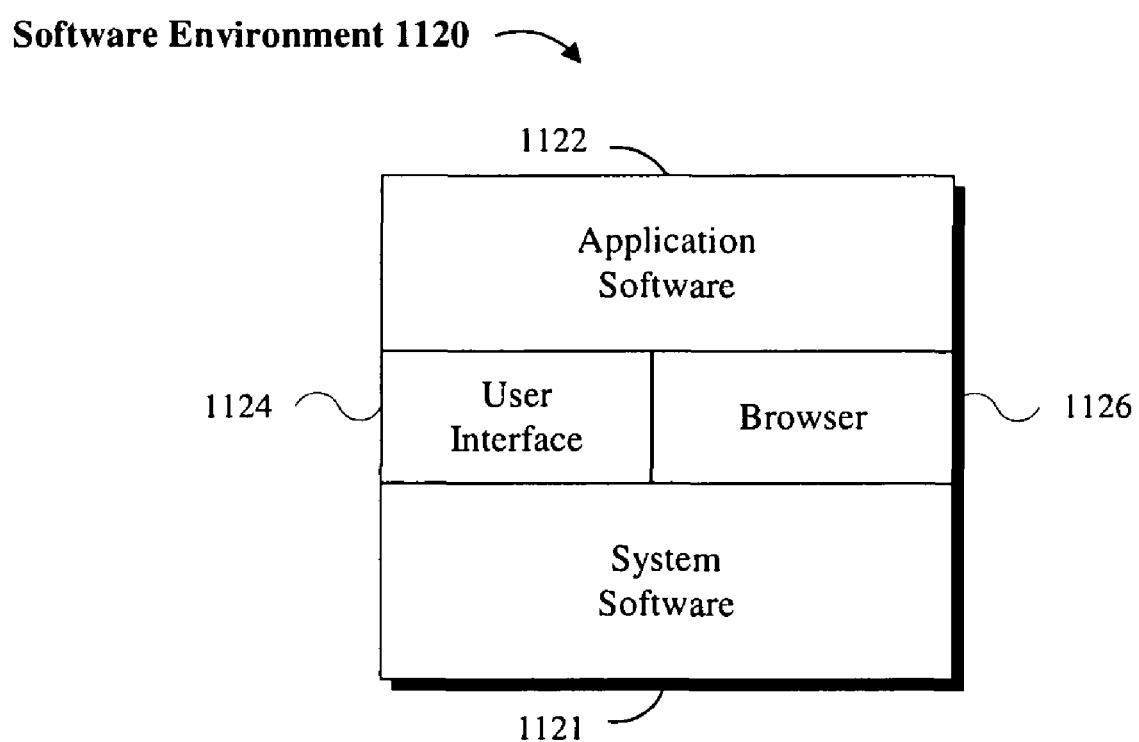

Referring to FIGS. 8 and 9, a computing system environment in accordance with an exemplary embodiment is composed of a hardware environment 1110 and a software environment 1120. The hardware environment 1110 comprises the machinery and equipment that provide an execution environment for the software; and the software environment 1120 provides the execution instructions for the hardware as provided below.

As provided here, software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 1120 is divided into two major classes comprising system software 1121 and application software 1122. In one embodiment, the PPS 130 may be implemented as system software 1121 or application software 1122 executed on one or more hardware environments to facilitate efficient duplicate filtering in a data processing system.

System software 1121 may comprise control programs, such as the operating system (OS) and information management systems that instruct the hardware how to function and process information. Application software 1122 may comprise but is not limited to program code, data structures, firmware, resident software, microcode or any other form of information or routine that may be read, analyzed or executed by a microcontroller.

In an alternative embodiment, the claimed subject matter may be implemented as computer program product accessible from a computer-usable or computer-readable medium providing program code for use by or in connection with a computer or any instruction execution system. For the purposes of this description, a computer-usable or computer-readable medium may be any apparatus that can contain, store, communicate, propagate or transport the program for use by or in connection with the instruction execution system, apparatus or device.

The computer-readable medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital video disk (DVD).

Referring to FIG. 8, an embodiment of the application software 1122 may be implemented as computer software in the form of computer readable code executed on a data processing system such as hardware environment 1110 that comprises a processor 1101 coupled to one or more memory elements by way of a system bus 1100. The memory elements, for example, may comprise local memory 1102, storage media 1106, and cache memory 1104. Processor 1101 loads executable code from storage media 1106 to local memory 1102. Cache memory 1104 provides temporary storage to reduce the number of times code is loaded from storage media 1106 for execution.

A user interface device 1105 (e.g., keyboard, pointing device, etc.) and a display screen 1107 can be coupled to the computing system either directly or through an intervening I/O controller 1103, for example. A communication interface unit 1108, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 1110 may not include all the above components, or may comprise other components for additional functionality or utility. For example, hardware environment 1110 can be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In some embodiments of the system, communication interface 1108 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 9, application software 1122 may comprise one or more computer programs that are executed on top of system software 1121 after being loaded from storage media 1106 into local memory 1102. In a client-server architecture, application software 1122 may comprise client software and server software. For example, in one embodiment, client software is executed on general computing system (not shown) and server software is executed on a server system (not shown).

Software environment 1120 may also comprise browser software 1126 for accessing data available over local or remote computing networks. Further, software environment 1120 may comprise a user interface 1124 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective processes of each method are performed are purely exemplary. Depending on implementation, the processes can be performed in any order or in parallel, unless indicated otherwise in the present disclosure. Further, the logic code is not related, or limited to any particular programming language, and may comprise of one or more modules that execute on one or more processors in a distributed, non-distributed or multiprocessing environment.

The claimed subject matter has been described above with reference to one or more features or embodiments. Those skilled in the art will recognize, however, that changes and modifications may be made to these embodiments without departing from the scope of the claimed subject matter. These and various other adaptations and combinations of the embodiments disclosed are within the scope of the claimed subject matter as defined by the claims and their full scope of equivalents.

What is claimed is:

1. A data processing method comprising:
    collecting a stream of data records from one or more devices connected in a computing network, wherein a first data record in the stream is uniquely identifiable based on an associated identifier having a first part and a second part, wherein the first part corresponds to a source of data generation that is common to the first data record and also to at least a second data record generated from the same source that generated the first data record, and the second part corresponds to an attribute of the first data record that is unique to the first data record;
    loading one or more persistent indexes associated with the stream of data records into memory, wherein an index associated with the first data record is configured such that the first part of the identifier associated with the first data record is stored in a first data structure as a first entry, and the second part of the identifier associated with the first data record is stored in a second data structure in association with a data file comprising content of the first data record, wherein the first entry in the first data structure points to the data file comprising the content of the first data record;
    identifying a duplicate data record in the stream of data records using the in-memory indexes, in response to determining that a first part and a second part of a second data record match the first part and the second part of the first data record, respectively; and
    updating a repository such that the duplicate data record is not stored in the repository.

2. The method of claim 1, wherein updates to the in-memory indexes are synchronized with the persistent indexes.

3. The method of claim 2, wherein a log of the updates is stored in a different storage subsystem for backup purposes.

4. The method of claim 1, wherein each data record in the stream of data records provides a higher-order value and a lower-order value.

5. The method of claim 4, wherein the higher-order value is registered with a control data structure used to access the persistent indexes.

6. The method of claim 4, wherein the higher-order value is registered with the control data structure for a limited period of time.

7. The method of claim 4, wherein a persistent index is generated for the higher-order value.

8. The method of claim 7, wherein the lower-order value is stored in a persistent index generated for a corresponding higher-order value.

9. The method of claim 4, wherein the higher-order value is shared by one or more data records.

10. The method of claim 4, wherein a first data record is a duplicate of a second data record if the first data record shares the higher-order value and the lower-order value with the second data record.

11. A data processing method comprising:
    collecting a stream of data records from one or more devices in a network, wherein a first data record in the stream is uniquely identifiable based on an associated identifier having a first part and a second part, wherein the first part corresponds to a source of data generation that is common to the first data record and at least a second data record generated from the same source as the first data records,
    wherein an index associated with the first data record is configured such that the first part of the identifier associated with the first data record is stored in a first data structure as a first entry, and the second part of the identifier associated with the first data record is stored in a second data structure as a data file comprising content of the first data record, wherein the first entry in the first data structure points to the data file comprising the content of the first data record;
    dividing the stream of data records into one or more sets of data records for parallel processing;
    identifying a duplicate data record in the stream of data records using in-memory indexes, in response to determining that a first part and a second part of a second data record match the first part and the second part of the first data record; and
    updating a repository such that the duplicate data records are not stored in the repository or managed differently than non-duplicate data records.

12. The method of claim 11, further comprising assigning a first set of data records to a first task for processing.

13. The method of claim 12, wherein the first set of data records provides one or more higher-order values.

14. The method of claim 13, wherein an index is generated for each higher-order value.

15. The method of claim 14, wherein access to the indexes is synchronized.

16. The method of claim 15, wherein the first task attempts to acquire access to each index generated for the higher-order values.

17. The method of claim 16, wherein the first task re-attempts to access each index generated for the higher-order values after a certain period of time, in response to failing to access each index generated for the higher-order values.

18. The method of claim 17, wherein each index generated for the higher-order values is loaded into memory, in response to successfully acquiring access to each index generated for the higher-order values.

19. The method of claim 16, wherein one or more records are re-assigned to a second task, in response to failing to access each index generated for the higher-order values.

20. The method of claim 19, wherein each index for which access is successfully acquired is loaded into memory, in response to successfully acquiring access to at least one index generated for the higher-order values.

* * * * *